United States Patent [19]

Moulin et al.

[11] 4,097,900
[45] Jun. 27, 1978

[54] ELECTRO-ACOUSTIC DEVICE FOR READING A TWO DIMENSIONAL IMAGE BY MEANS OF AN ELECTRODE NETWORK

[75] Inventors: Michel Moulin; Bernard Munier, both of Paris, France

[73] Assignee: Thomson-CSF, Paris, France

[21] Appl. No.: 751,942

[22] Filed: Dec. 17, 1976

[30] Foreign Application Priority Data

Dec. 23, 1975 France .............................. 75 39526

[51] Int. Cl.² .............................................. H04N 5/30
[52] U.S. Cl. ................................... 358/213; 310/313
[58] Field of Search ................ 358/213; 310/9.8, 322, 310/323, 313; 250/211 R, 211 J; 340/173 LS

[56] References Cited

U.S. PATENT DOCUMENTS 3,935,564    1/1976    Quate et al. ................... 358/213 X Primary Examiner—Robert L. Richardson
Attorney, Agent, or Firm—Roland Plottel

[57] ABSTRACT

A device for the line-by-line electrical analysis of an image. It comprises a piezo-electric medium associated with a semiconductor medium scanned by the interaction of two elastic waves propagated at the surface of the piezoelectric medium, and an electrode network. The electrodes are disposed on the semiconductor medium parallel to the scanning direction and each of which supplies an electrical signal the amplitude of which characterizes the luminous intensity of the elementary zones of the image.

10 Claims, 10 Drawing Figures

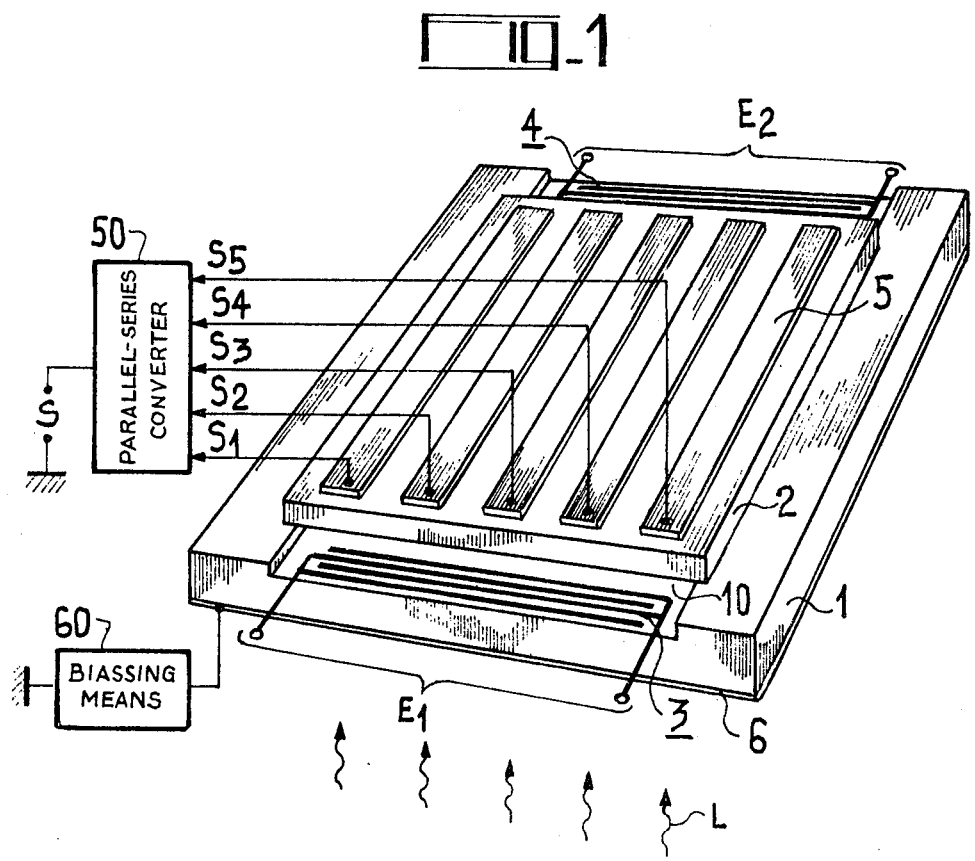
Fig. 1
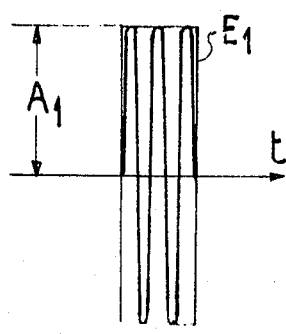
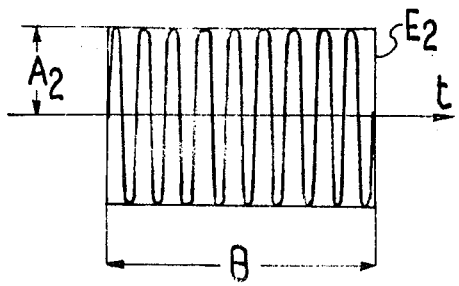
Fig. 2

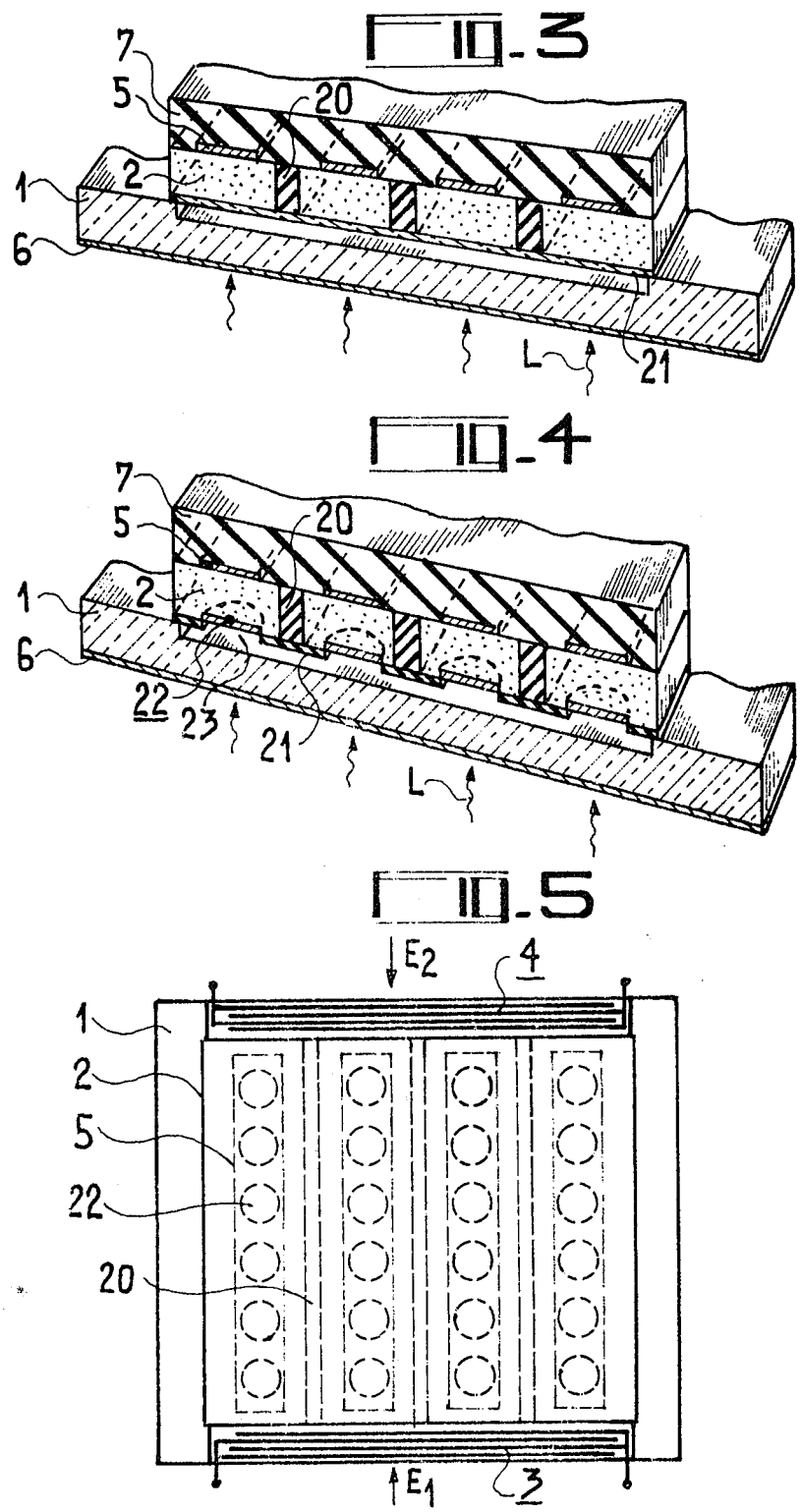

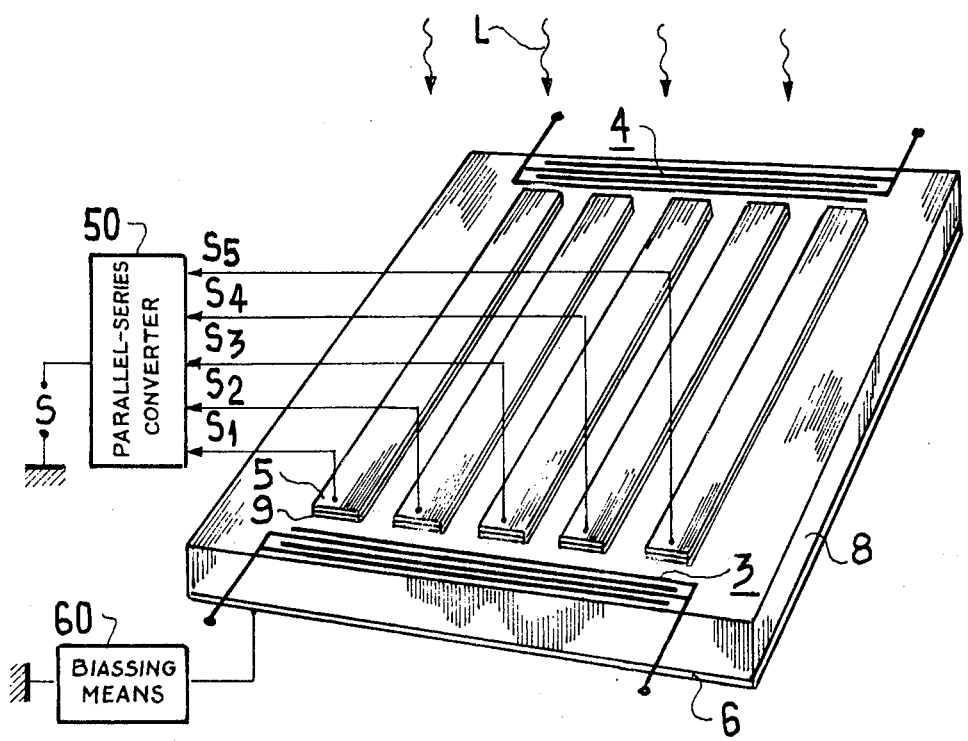

ELECTRO-ACOUSTIC DEVICE FOR READING A TWO DIMENSIONAL IMAGE BY MEANS OF AN ELECTRODE NETWORK

This invention relates to a device for electrically reading an optical image in two dimensions by means of acoustic surface waves and an electrode network.

The reading of images by means of elastic, or acoustic, waves is generally carried out by way of non-linear interactions between two electrical fields in a semiconductor, these electrical fields being the fields associated with the deformations of a piezoelectric crystal along which elastic surface waves are propagated. The signal representing the interaction may be the electrical current which arises out of this interaction and which flows through the semiconductor. The image to be read is projected onto the semiconductor where, by spatially modulating the conductivity thereof, it modulates the intensity of the signal arising out of the non-linear interaction.

The present invention relates to the use of structures of this type for reading an optical image in two dimensions.

According to the invention, there is provided an electro-acoustic device for reading an optical image in two dimensions, comprising:

a semiconductive and photosensitive medium onto which said image is projected on a interaction surface;

a piezoelectric medium coupled with said semiconductive medium and carrying at least two electromechanical transducers on its surface, said transducers generating two elastic surface waves in opposite directions under electrical control, one of said waves being in the form of a pulse and the other in the form of a long wave of which the duration is at least equal to twice the time taken by said pulse to scan said interaction surface, the scanning of said interaction surface by said pulse producing, by means of non-linear interaction with said long wave, an electrical signal of which the amplitude at each point is dependent upon the illumination at the point;

an electrode network carried by said semiconductor medium, said electrodes being electrically insulated from one another and being substantially parallel to the propagation direction of the elastic waves, the electrical signals collected respectively by each of said electrodes together representing the line-by-line analysis of said image, each electrode constituting an analysis line.

For a better understanding of the invention and to show how it can be carried into effect, reference will be made to the following description and the accompanying drawings, wherein:

FIG. 1 shows a first embodiment of the device according to the invention in which the two media, namely the piezoelectric and semdiconductor media, are formed by two separate materials arranged adjacent one another.

FIGS. 2a and 2b show forms of the signals which may be used in this device.

FIG. 3 is a section through a variant of the embodiment shown in FIG. 1.

FIGS. 4 and 5 show a variant in which the sensitivity of the device is improved by the addition of discrete elements to the semiconductor medium.

FIG. 9 shows a third embodiment of the device according to the invention in which the piezoelectric medium and the semiconductor medium are combined in one and the same medium.

In these various Figures, the same reference numerals denote the same elements.

FIG. 1 shows:

Figure 6:
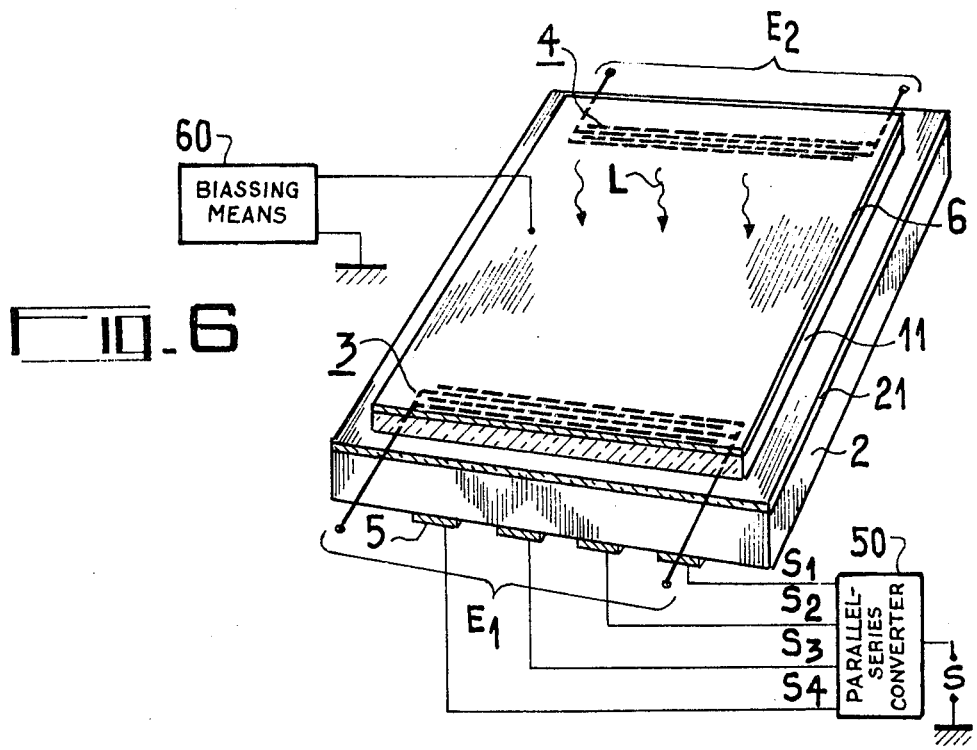
FIG. 6 shows a second embodiment of the device according to the invention in which the piezoelectric medium is formed by a thin layer deposited onto the semiconductor medium.

a piezoelectric medium 1 in the form of a thin plate formed with a central opening 10 extending over its entire length;

two electromechanical transducers 3 and 4 disposed on the piezoelectric plate 1 at either end of the opening 10. These transducers are of the interdigital comb type and generate elastic waves propagated at the surface of the piezoelectric medium in response to the application of an electrical signal $E_1$ (transducer 3) or $E_2$ (transducer 4);

a semiconductive and photosensitive medium 2 in the form of a thin plate disposed on the piezoelectric plate 1, above the opening 10, so that a layer of air is left between the materials 1 and 2 to prevent the elastic waves from being damped;

an electrode 6 covering the lower surface of the piezoelectric material 1, which is opposite the semiconductor 2 and an electrode network 5, arranged on the upper surface of the semiconductor 2 which is opposite the piezoelectric material 1, the electrodes of the network being parallel to the direction of propagation of the elastic waves and electrically insulated from one another.

In operation, the image to be analyzed is projected onto the photosensitive semiconductor 2, preferably onto the lower surface of the semiconductor, which is opposite the piezoelectric material 1, along a surface refered to as the interaction surface. It is this which is illustrated in the Fig. where the image, represented by arrows L, is projected onto the semiconductor through the piezoelectric material which is assumed to be transparent to the incident radiation. It is also possible to project the image from the side of the semiconductor. In this case, however, the thickness of the semiconductor has to be small by comparison with the diffusion length of the electrical charges created by the illumination.

Electrical signals $E_1$ and $E_2$, of which the form is shown by way of example in FIGS. 2a and 2b, are then applied to each of the transducers 3 and 4. FIG. 2a shows the signal $E_1$ applied to the transducer 3. It is in the form of a pulse with an amplitude $A_1$ and a carrier angular frequency $\omega$. The elastic wave transmitted by the transducer 3 has a wave number $k = \omega/v$, $v$ being the propagation velocity of the elastic waves on the substrate 1. FIG. 2b shows the signal $E_2$ applied to the transducer 4. It is a long rectangular signal with a duration $\theta$, an amplitude $A_2$ preferably lower than $A_1$ and with the same angular frequency $\omega$. The duration $\theta$ of this signal $E_2$ should be equal to at least twice the time taken by an elastic wave to scan the surface with the same area as the interaction surface. where the image to be analyzed is projected.

The pulse $E_1$ is only applied to the transducer 3 when the wave corresponding to the signal $E_2$, generated by the transducer 4, occupies the entire interaction surface. Thus, when the pulse is propagated from the transducer 3 towards the transducer 4, it interacts sequentially with the waves corresponding to the signal $E_2$ over the entire length of the piezoelectric material.

It is known that this non-linear interaction, in the semiconductor, of the electrical fields associated with the deformations of the piezoelectric material is represented by a signal which, for the signals $E_1$ and $E_2$ described above, is a signal of angular frequency $2\omega$ and wave number zero. That interaction signal further is amplitude-modulated in dependence upon the image L by way of the spatial modulation of the conductivity of the semiconductor. This signal may be the electrical current which flows through the semiconductor and which is thus collected by the system of electrodes 5 disposed on the upper surface of the semiconductor, each of the electrodes supplying a signal S ($S_1$ to $S_5$ in the Fig.) representing an image band or line.

The various line signals $S_1$ to $S_5$ are directed for example towards an element 50 which supplies a signal S reading the image sequentially line-by-line, the element 50 which is a parallel-serie signal converter, thus carrying out the switching between the lines in synchronism with the signal $E_1$ in known manner. It is also possible to introduce a memory element at the level of the element 50.

The device shown in FIG. 1 further comprises means for biassing the structure, formed for example by a biassing voltage source 60 connected between the reference potential and the electrode 6. The object of this biassing is to optimise the sensitivity of the device to the incident light.

FIG. 3 is a section through a variant of the device illustrated in FIG. 1.

FIG. 3 again shows the piezoelectric plate 1 covered over its lower surface by the electrode 6 surmonted by the semiconductor plate 2 and its system of electrodes 5.

The structure additionally comprises:

an insulating substrate 7 arranged on the upper surface of the semiconductor 2 which carries the electrode network 5 and which forms a mechanical support;

a series of highly resistive bands 20, realized in the semiconductor 2 between the electrodes 5 and over the entire thickness of the semiconductor. These bands are intended to decouple the signals corresponding to each image line;

a thin insulating layer 21 deposited on the lower surface of the semiconductor 2 in order to eliminate surface effects, because the surface of the semiconductor may show random structural dislocations due to impurities which constitute traps for the electrical charges, thus interfering with the operation of the structure. The treatment of the surface of the semiconductor 2, for example by oxidation to form the layer 21, enables the electronic properties of that surface to be defined more precisely.

As in the device illustrated in FIG. 1, the image to be analyzed (arrows L) is projected onto the lower surface of the semiconductor 2, situated on the side of the interactions between the elastic waves.

FIGS. 4 and 5 are, respectively, a section through and plan view of a variant embodiment of the device according to the invention in which its sensitivity is improved.

The structure shown in FIG. 4 is identical with that shown in FIG. 3 except for the lower surface of the semiconductor 2 where the insulating layer 21 is interrupted opposite each of the electrodes 5 by a discrete series of openings 23. Zones doped with a conductivity type opposite to that of the semiconductor 2 to form diodes 22 are created in these openings. FIG. 5 is a plan view of the structure illustrating the alignment of the diodes 22.

As described in patent application No. 721,569, the presence of the PN junctions 22 is normally to create depletion zones around the junctions, i.e., zones depleted of majority charge carriers. The result is that the effects of the incident light L are more significant, the formation of electron-hole pairs by the photons taking place in a medium depleted of charge carriers. In addition, since the increase in sensitivity is local (i.e., limited to the site of each junction), the elemental image zones are thus materially delimited and isolated and the quality of the restored image is improved.

A structure comprising PN diodes has been described in the foregoing. It is of course possible to replace these diodes by other types of junctions and, in particular, by Schottky diodes. Diodes such as these may be formed, for example, by depositing a metallic electrode in each of the openings formed in the insulating layer 21. The operation of the structure obtained is similar to that of the structure described above.

It has been assumed in the foregoing that signals $E_1$ and $E_2$ of the same frequency were applied to the transducers 3 and 4, which implies that the wave number (K) of the signals produced by the non-linear interaction is zero. The lower surface of the semiconductor 2 thus forms a phase plane and the signal arising out of the interaction may be extracted at any point of that plane. The consequence is that the spacing of the diodes is unimportant.

In cases where it is desired to carry out signal processing, the signals applied to the transducers 3 and 4 may be frequency-modulated or may even have different frequencies. Since, in the latter case, the resulting wave number K is not zero, a periodicity has to be introduced either by means of the image (grid of which the bars, normal to the direction of propagation of the elastic waves, are separated by intervals p) or by means of the diodes thus regularly spaced at intervals p, with $p = 2\pi/K$.

Figure 7:
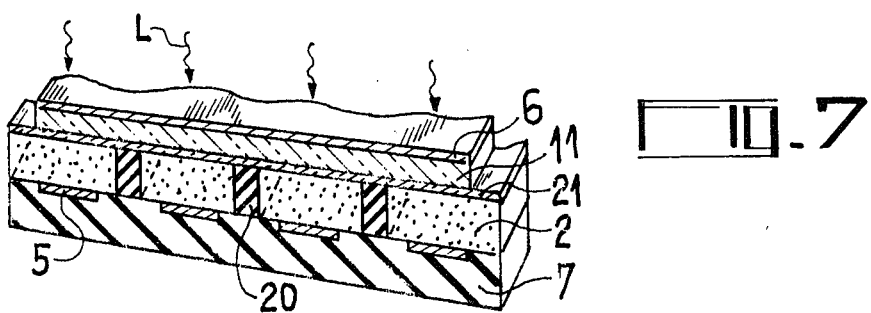
FIG. 7 is a section through a variant of the embodiment shown in FIG. 6.

FIGS. 6 and 7 are, respectively, a perspective view of and a section through another embodiment of the device according to the invention, in which the piezoelectric medium is formed by a thin layer deposited onto a semiconductor substrate.

FIG. 6 shows:

the semiconductor and photosensitive material 2 in the form of a plate which, on its lower surface, carries the electrodes 5 which are parallel to and insulated from one another and which collect the interaction signal ($S_1$ to $S_4$ in FIG. 6 for each of the electrodes); the plate 2 is optionally covered over its upper surface by the thin insulating layer 21:

the piezoelectric material which is in the form of a thin layer 11 deposited onto the insulating layer 21 of which the thickness is at most of the order of the elastic wave length and typically of the order of a fraction, for example one tenth, of that wave length; the piezoelectric layer 11 carries the electrode 6 on its upper surface;

the electromechanical transducers 3 and 4 which are deposited either onto the upper surface of the piezoelectric layer 11, in which case the area occupied by the electrode 6 is reduced to the space situated between the transducers, or as shown in the FIG. at the interface of the layers 11 and 21; they generate elastic surface waves whose propagation is permitted by the limited thickness of the piezoelectric layer 11.

The mechanism for scanning the surface where the image L is projected, by the non-linear interaction is the same as before and, similarly, the electrode 6 is connected to an outer biassing source 60, the transducers 3 and 4 are excited respectively by electrical signals, such as $E_1$ and $E_2$, the image to be analyzed (L) is projected onto the upper surface of the semiconductor 2 which is opposite the semiconductive layer 3 through that layer, and the electrodes 5 are connected to the block 50 which enables a series signal S to be obtained if necessary.

FIG. 7 is a section through a variant of the embodiment illustrated in FIG. 6. Accordingly, FIG. 7 shows, successively and from the side of the incident light L, the electrode 6, the thin piezoelectric layer 11, the insulating layer 21, the semiconductor 2 and the electrodes 5 extending in a direction perpendicular to the plane of the section.

As in the case of FIG. 3, the semiconductor medium 2 is provided with insulation zones 20 intended to decouple the electrodes 5, and the structure as a whole is provided with an insulating supporting layer 7 disposed on the electrodes 5.

Figure 8:
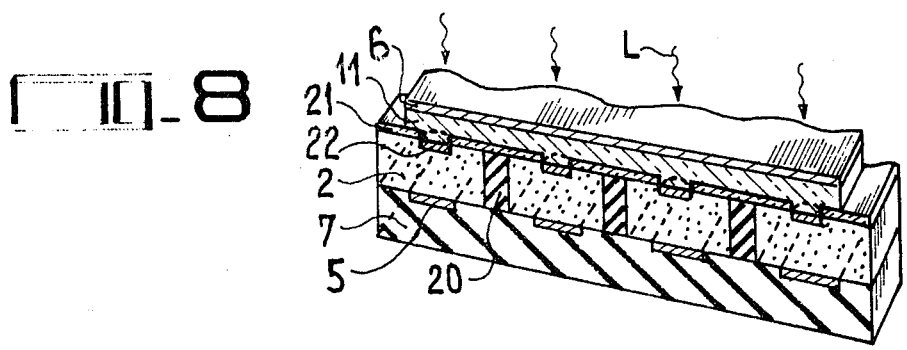
FIG. 8 shows a variant of the preceding embodiment in which the semiconductor medium comprises discrete elements.

FIG. 8 shows a variant of the embodiment illustrated in the preceding Figs. where, similar to the illustration of FIG. 4, the sensitivity of the structure is improved by the addition of diodes to the semiconductor.

Accordingly, FIG. 8 shows the same elements as FIG. 7 except for the fact that the insulating layer is provided with a series of openings at the level of the electrodes 5 and a doping with an opposite conductivity type to the remainder of the material is formed in the openings in the same way as in the structure illustrated in FIGS. 4 and 5. A series of PN-type diodes 22 is thus obtained, their operation and function being the same as before, namely to increase the sensitivity of the structure. Similarly, the PN junctions may be replaced by Schottky diodes.

In the variant illustrated in FIG. 8, the diodes are of course only disposed at the level of the interaction surface, i.e., the surface where the image L to be analyzed is projected, and the transducers 3 and 4 (FIG. 6) are again arranged on either side of that zone, for example at the interface of the layers 11 and 21.

As in the embodiments illustrated in FIGS. 4 and 5, the spacing of the diodes is unimportant in cases where the signals $E_1$ and $E_2$ have the same frequency.

One technological embodiment of the structure according to the invention is described by way of non-limiting example in the following.

So far as the choice of materials is concerned, the piezoelectric material may be lithium niobate (LiNbO$_3$), zinc oxide (ZnO), gallium or aluminium nitride, etc. Accordingly, the insulating layers 21 are made of silicon oxide SiO$_2$, silicon nitride Si$_3$N$_4$, or alumina Al$_2$O$_3$. The semiconductor is selected in particular according to the wave length range to which it is sensitive and may consist, for example, of silicon, gallium arsenide and numerous binary compounds of Groups III and V of the Periodic System or of Groups II and VI or IV and VI of that system.

In cases where the structure is formed by two separate materials (semiconductor and piezoelectric material separated by a layer of air), the semiconductor material 2 may be formed from a P-type semiconductor substrate on which the electrode network 5 is formed by an N$^+$ diffusion. A thin N-type layer (of the order of 10 $\mu$m) is then deposited by epitaxial growth, the bands 20 being formed by P$^+$ diffusion in that thin layer. The electrodes 5 are thus insulated by the bands 20 by P-N junction effect. P-N junctions or Schottky junctions (22 in FIGS. 4 and 5) are then formed on this structure by any technique known in the field of semiconductors.

In cases where the structure is formed by a thin piezoelectric layer (11) deposited onto a semiconductive plate (2), the plate 2 is formed, for example, by silicon, the insulating layer 21 is formed by silicon oxide SiO$_2$, the transducers 3 and 4 are vapor-deposited onto the layer 21 and the piezoelectric layer 11 by cathode sputtering.

In addition as mentioned above, the structure according to the invention, instead of being formed from two separate materials (semiconductor and photoconductor on the one hand and the piezoelectric material on the other hand), may be formed from a single substrate showing both properties i.e., piezoelectricity and semiconductivity, at the same time. It is this case which is shown in FIG. 9.

Accordingly, the substrate 8, in the form of a plate, is at the same time semiconductive, photosensitive and piezoelectric. It is made for example of cadmium sulphide or gallium arsenide. It is covered over its lower surface by an electrode 6 and, over its upper surface, by transducers 3 and 4 and electrodes 5 extending parallel to the propagation direction of the elastic waves, as in FIG. 1, but separated from the substrate 8 by a thin layer 9 of dielectric. Means for biassing the substrate may be provided and may be formed, for example as shown in FIG. 9, by a voltage source 60 connected between the electrode 6 and earth.

The structure operates in similar fashion to the preceding cases, the image L to be analyzed being projected onto that surface of the substrate 8 which carries the electrodes 5, through these electrodes, and the interaction signal S being extracted between the electrodes 5 and earth.

Finally, as in the preceding embodiments, the sensitivity of the structure may be improved by means of PN or Schottky junctions disposed on that surface of the substrate which carries the electrodes 5 and aligned with these electrodes, as shown in FIG. 5.

Of course, the invention is not limited to the embodiments described and shown, which were given solely by way of example.

What is claimed is:

1. An electro-acoustic device for reading an optical image in two dimensions, comprising:
    a semiconductive and photosensitive medium onto which said image is projected on a interaction surface;
    a piezoelectric medium coupled with said semiconductive medium and carrying at least two electromechanical transducers on its surface, said transducers generating two elastic surface waves in opposite directions under electrical control, one of said waves being in the form of a pulse and the other in the form of a long wave of which the duration is at least equal to twice the time taken by said pulse to scan said interaction surface, the scanning of said interaction surface by said pulse producing, by means of non-linear interaction with said long wave, an electrical signal of which the amplitude at each point is dependent upon the illumination at that point;

an electrode network carried by said semiconductor medium, said electrodes being in ohmic contact with said semiconductor medium and electrically insulated from one another and being substantially parallel to the propagation direction of the elastic waves, the electrical signals collected respectively by each of said electrodes together representing the line-by-line analysis of said image, each electrode constituting an analysis line.

2. A device as claimed in claim 1, wherein said semiconductor medium comprises, between said electrodes, bands extending over the entire thickness of that medium and insulating said electrodes.

3. A device as claimed in claim 2, wherein said bands have an opposite conductivity type to said semiconductor medium.

4. A device as claimed in claim 1, wherein the two said elastic waves have the same frequency.

5. A device as claimed in claim 1, wherein said semiconductive medium is formed by a plate onto which is deposited a layer of piezoelectric material forming said piezoelectric medium of which the thickness is at most of the order of the elastic wave length.

6. A device as claimed in claim 1, wherein the semiconductive and photosensitive medium on the one hand and the piezoelectric medium on the other hand are combined in a single substrate.

7. A device as claimed in claim 1, further comprising biassing means.

8. A device as claimed in claim 7, wherein said biassing means are formed by a further electrode covering that surface of the piezoelectric medium which is opposite said interaction surface, connected to an external potential source.

9. A device as claimed in claim 1, further comprising a discrete assembly of diodes of the P-N or Schottky type, provided on said interaction surface and aligned with and opposite said electrodes of said network.

10. An electro-acoustic device, for reading an optical image in two dimensions, comprising:

a semiconductive and photosensitive medium onto which said image is projected on a interaction surface;

a piezoelectric medium coupled with said semiconductive medium and carrying at least two electro-mechanical transducers on its surface, said transducers generating two elastic surface waves in opposite directions under electrical control, one of said waves being in the form of a pulse and the other in the form of a long wave of which the duration is at least equal to twice the time taken by said pulse to scan said interaction surface, the scanning of said interaction surface by said pulse producing, by means of non-linear interaction with said long wave, an electrical signal of which the amplitude at each point is dependent upon the illumination at that point;

an electrode network carried by said semiconductor medium, said electrodes being in ohmic contact with said semiconductor medium electrically insulated from one another and being substantially parallel to the propagation direction of the elastic waves, the electrical signals collected respectively by each of said electrodes together representing the line-by-line analysis of said image, each electrode constituting an analysis line, and wherein said piezoelectric medium is formed by a first plate and said semiconductor medium is formed by a second plate, said device further comprising means ensuring the interposition of a layer of air between said two plates, said interaction surface being carried by that surface of said second plate which is opposite said first plate, said elastic waves being propagated over that of the surface of said first plate which is opposite said interaction surface, said electroe network being disposed on that surface of said second plate which is opposite said interaction surface.

* * * * *